United States Patent [19]

MacKinnon

[11] Patent Number: 4,903,672
[45] Date of Patent: Feb. 27, 1990

[54] FUEL TANK OVERFILL PREVENTION

[75] Inventor: Donald T. MacKinnon, Birmingham, Mich.

[73] Assignee: General Motors Corporation, Detroit, Mich.

[21] Appl. No.: 316,042

[22] Filed: Feb. 27, 1989

[51] Int. Cl.[4] .................... F02M 33/02; B01D 53/04
[52] U.S. Cl. .................... 123/520; 123/519; 137/587
[58] Field of Search ............... 123/516, 518, 519, 520, 123/521; 137/587, 588, 589; 220/86 R, 85 VR, 85 VS, 85 S

[56] References Cited

U.S. PATENT DOCUMENTS

| | | | |
|---|---|---|---|
| 3,586,016 | 6/1971 | Meyn | 137/39 |
| 3,687,335 | 8/1972 | Hunter | 220/85 |
| 3,703,165 | 11/1972 | Hansen | 123/136 |
| 3,779,224 | 12/1973 | Tagawa et al. | 123/136 |
| 3,907,153 | 9/1975 | Mutty | 137/587 |
| 4,343,281 | 8/1982 | Uozumi | 123/520 |
| 4,679,580 | 7/1987 | Devall et al. | 137/39 |
| 4,701,198 | 10/1987 | Uranishi | 137/587 |
| 4,706,636 | 11/1987 | Davis | 123/516 |
| 4,742,809 | 5/1988 | Ito | 123/516 |
| 4,748,959 | 6/1988 | Cook | 123/520 |
| 4,790,283 | 12/1988 | Uranishi | 123/516 |
| 4,809,666 | 3/1989 | Baltz | 123/516 |
| 4,815,436 | 3/1989 | Sasaki | 123/520 |
| 4,817,576 | 4/1989 | Abe | 123/518 |
| 4,819,607 | 4/1989 | Aubel | 123/518 |

FOREIGN PATENT DOCUMENTS

| | | | |
|---|---|---|---|
| 2743490 | 4/1979 | Fed. Rep. of Germany | 137/587 |
| 0161952 | 12/1980 | Japan | 123/519 |
| 0164763 | 12/1980 | Japan | 123/518 |
| 0110548 | 9/1981 | Japan | 123/516 |

Primary Examiner—Carl Stuart Miller
Attorney, Agent, or Firm—Patrick M. Griffin

[57] ABSTRACT

Tank overfill is prevented by a series of three switches, responsive to the condition of the vehicle running or not, to tank pressure, and to elapsed time, which block the canister vent line at the end of fill to prevent contamination, and then reopen it when a short time has elapsed, or when the vehicle is restarted.

2 Claims, 1 Drawing Sheet

FUEL TANK OVERFILL PREVENTION

This invention relates to vehicle fuel systems in general, and specifically to a means for preventing overfill of a vehicle fuel tank.

BACKGROUND OF THE INVENTION

Modern vehicle fuel systems generally include a vapor storage canister to collect at least those vapors from the tank that form as the tank sits, often called the diurnal vapors. A vent line typically runs from a vapor pressure chamber at the top of the tank to the storage canister, and is often restricted so as not to actually encourage the formation of vapors in the tank as it sits. If, during filling of the tank, liquid is allowed to rise high enough in the tank to reach the vent line, it could conceivably reach and contaminate the adsorbent material in the canister. Therefore, it has been the practice to provide an overfill protection float internal to the tank, below the opening of the vent line into the top of the tank, which is buoyed up to block the vent line in the event of overfill.

SUMMARY OF THE INVENTION

The invention provides a different mechanism and a different way of preventing fuel overfill from getting into the vent line. Instead of a float internal to the tank, a blocking valve, completely external to the tank, is specially controlled so as to prevent liquid fuel from rising high enough in the tank to reach the vent line opening.

A preferred embodiment of the overfill protection system of the invention is disclosed in a vehicle that produces oil pressure only when the vehicle is running, and which has a fuel tank that is filled when the vehicle is not running. A vapor storage canister is connected by a vent line to the space near the top of the tank, which comprises a vapor pressure chamber in which vapor pressure rises as the liquid fuel rises, if all vapor exits from the chamber are closed. A slidable blocking valve interrupts the vent line, and can be moved between open and closed positions. The blocking valve is spring loaded continually to the open position, and is closed only when the spring is overcome. The spring can be overcome by a solenoid, but the spring takes the blocking valve to the open position when the solenoid is not energized.

A circuit containing three different electrical switches in series selectively energizes and deenergizes the solenoid, to close and open the vent line, depending on whether the engine is running and on how high the tank pressure has risen. One of the switches is activated by oil pressure, and is closed only when the vehicle is not running, but open otherwise. Another switch is a tank pressure switch that sees the pressure in the tank vapor pressure chamber, and is closed only when that pressure rises above a predetermined threshold value. The threshold value is set to be greater than the normal pressures generated in the tank, so that the venting of normal diurnal vapors is not jeopardized, but is less than the pressure rise in the chamber that can be expected at the end of fuel fill when the rising liquid compresses the vapors at the top of the tank. The third switch is a timed electrical switch which is set to stay closed and pass current for only a predetermined time after it is first energized, and which then automatically opens to interrupt any circuit of which it is a part. Since all three switches are in series, the solenoid is energized, and the the blocking valve consequently closed, only when all three are closed.

When the tank is being filled, the vehicle is turned off, so the oil pressure switch will stay closed. Toward the end of the fill operation, the vapor pressure in the tank rises faster than it can be bled off by the restricted vent line to the canister. When it passes the threshold, the tank pressure switch closes, and the timed switch is energized. All three switches are now closed, so the solenoid closes the vent line. With the vent line blocked, all vapor exits are closed, and no more fuel can be pumped into the tank. After the tank filling operation is stopped, the circuit will be broken, either by the timed switch automatically opening, or by the vehicle being restarted, and the vent line will reopen.

It is, therefore, a general object of the invention to provide an overfill protection system that does not need a float or other shutoff device internal to the fuel tank.

It is another object of the invention to protect the canister by preventing the liquid fuel from rising up to the vent line opening, rather than providing a device that is activated to shutoff the vent line opening when the fuel has risen to the vent line opening.

It is another object of the invention to provide an overfill protection system with a series of three switches responsive to whether the vehicle is running, to tank pressure, and to time so as to specifically tailor vent line shutoff and reopening to the conditions desired.

These and other objects and features of the invention will appear from the following written description, and from the drawings.

DESCRIPTION OF THE PREFERRED EMBODIMENT

Figure 1:
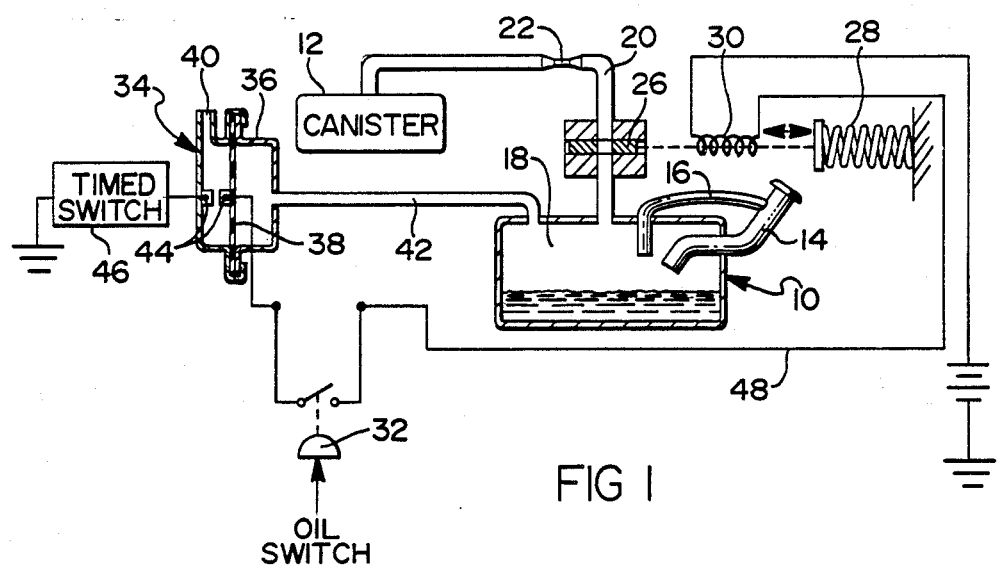
FIG. 1 is a schematic view of a vehicle fuel system incorporating the invention when the vehicle is not running and when the fuel level in the tank is less than completely full.

Referring to FIG. 1, the invention is incorporated in a vehicle fuel system that includes a fuel tank indicated generally at 10 and a vapor storage canister 12. Tank 10 has a filler pipe 14 and a vent pipe 16 that runs from the interior of tank 10 to the top of filler pipe 14. The space above the level of the liquid fuel at the top of tank 10, indicated at 18, comprises a vapor pressure chamber for tank 10, which, in some tanks, might be a distinct interior structure. As tank 10 sits, chamber 18 would fill with a pressurized mixture of air and vaporized fuel, at a greater or lesser pressure depending on ambient temperature, fuel volatility, and other factors. These are generally referred to as diurnal vapors, which, if vented to atmosphere in order to keep their pressure from becoming too great, would be referred to as diurnal losses. Modern vehicles, however, prevent diurnal loss by providing a diurnal vent line that runs through the the top of tank 10, from pressure chamber 18 to canister 12. Canister 12 has a bed of adsorbent that is typically open to atmosphere at one end, so that the air and vapor mixture migrates through it, with the fuel vapor being adsorbed and the air expelled. In order to not actually encourage the formation of tank vapors by providing too easy an exit, the diurnal vent line 20 is generally restricted, as at 22. In addition, since the restricted vent line 20 cannot release higher than normal pressures, tank 10 would likely include a conventional high pressure relief valve, not illustrated.

Figure 2:
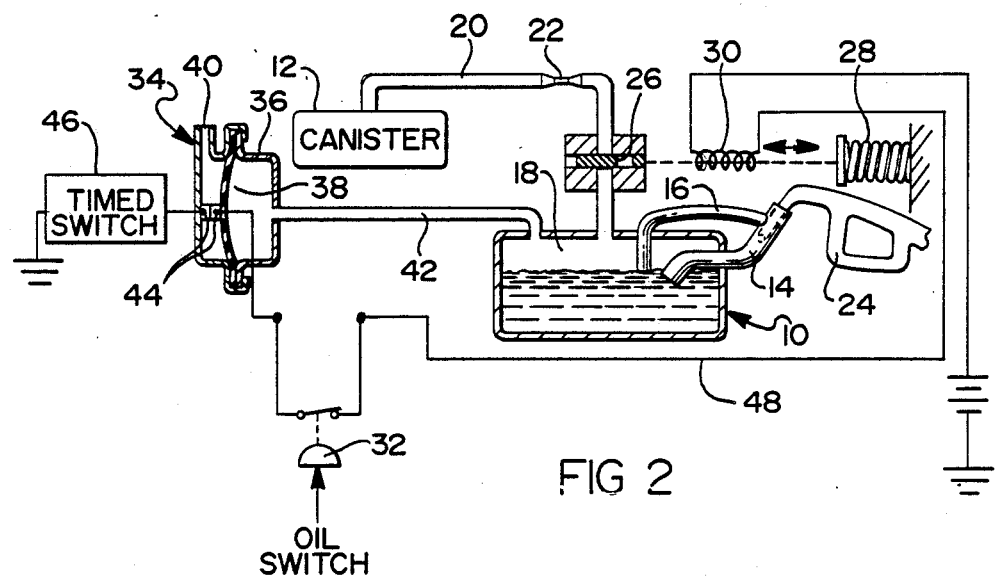
FIG. 2 is a view like FIG. 1, but with the vehicle not running, and with the tank just having been completely filled.

Referring next to FIG. 2, tank 10 would be filled with a conventional fuel nozzle 24 inserted in filler pipe 14. During fuel fill, a less restricted outlet than vent line 20 is needed for the fuel vapors displaced by the entering liquid fuel to exit, as they would otherwise compress and pressurize chamber 18 and prevent rapid fill. Vent pipe 16 provides that ready outlet. When liquid fuel has risen high enough in tank 10 to block the end of vent pipe 16, as shown in FIG. 2, the easy exit ceases, and the full condition of tank 10 is defined. With the entrance of any more liquid fuel to tank 10, vapor pressure would begin to rise rapidly in chamber 18, backing liquid fuel quickly up filler pipe 14 to automatically shut off nozzle 24. The operator, however, may try to ease more fuel into tank 10. If added slowly enough, the diurnal vent line line 20, even through restricted, could provide enough vapor exit to allow the addition of the extra fuel. If liquid fuel reached vent line 20, it could potentially reach and contaminate canister 12. A conventional buoyant float located inside tank 10 below the opening of vent line 20 would act as a shut off, but only after fuel had risen far enough to buoy up the float.

Referring next to FIGS. 1 and 2, a preferred embodiment of the the invention provides a different overfill protection scheme, one entirely external to tank 10, which not only prevents overfill liquid from getting into diurnal vent line 20, but prevents the liquid from rising that high initially. Diurnal vent line 20 is interrupted by a blocking valve 26 at a location below restriction 22. Valve 26 can slide between an open position that allows normal venting, FIG. 1, and a closed position that blocks vent line 20, FIG. 2. Valve 26 is continually biased by a spring 28 to the left, as so is normally open. A solenoid 30, if energized, can overcome the spring 28 to take valve 26 to the open position. A series of three electrical switches are interconnected so as to energize or deenergize solenoid 30 in response to whether the vehicle is running or not, in response to tank pressure rising to a threshold level, and in response to elapsed time.

Referring next to FIG. 1, the switch that responds to whether the vehicle is running is indicated at 32. As disclosed, the vehicle switch 32 is an oil pressure activated switch, which could be connected to a convenient oil line, and which is open only when it sees oil pressure, and closed when the vehicle is not running. The tank pressure switch, indicated generally at 34, includes a housing 36 divided by a diaphragm 38, open to atmosphere on one side by a vent 40 and open on the other side to tank pressure through a pressure line 42. A set of electrical contacts 44 on the diaphragm 38 engage only when diaphragm 38 is bulged to the left. The threshold pressure differential that would activate tank pressure switch 34 would be set to be slightly greater than the pressure that would be normally generated by diurnal vapors, though less than the pressure that would be expected in chamber 18 at the end of fill, and less than the above normal tank pressure that would open any high pressure relief valve in the system. The switch that responds to elapsed time, indicated diagramatically at 46, is the type that stays closed for a only for a predetermined time interval after being energized, then automatically opens. That time interval would be set to be longer than a typical operator would be likely to try to squeeze in more fuel at the end of fill, and would likely be approximately six to ten minutes. A connecting circuit generally at 48 connects all three switches 32, 34 and 46 in series.

Comparing FIGS. 1 and 2, if the vehicle is running, at least the oil pressure switch 32 will be open, so that the connecting circuit 48 remains uncompleted and solenoid 30 cannot energize. Blocking valve 26 remains open, as does diurnal vent line 20. Should pressure build in the vapor pressure chamber 18 for any reason, diaphragm 38 could bulge to the left, engaging the contacts 44, but, again, no circuit would be completed, since oil pressure switch 32 would be open. If the vehicle is not running, oil pressure switch 32 will remain closed, giving the potential for circuit 48 to be completed. If the pressure in chamber 18 should rise higher than the normal diurnal vapor pressure threshold for any reason, which would bulge diaphragm 38 to the left and engage the contacts 44, then timed switch 46 would be energized, completing circuit 48, and energizing solenoid 30 to close valve 26. If the tank pressure rose while tank 10 was closed, as in FIG. 1, then the closing of valve 26 would be essentially irrelevant. If conditions were right, the pressure in tank 10 might continue to rise to the point where the tank high pressure relief valve would open. This would lower tank pressure quickly, and reopen the tank pressure switch 34 to break circuit 48 and reopen valve 26. In any event, the timed switch 46 would reopen soon, anyway. The pressure might also rise during fuel fill, as illustrated in FIG. 2. That would also close tank pressure switch 34 and blocking valve 26. Then, no more fuel can be pumped in so long as timed switch 46 is closed, which will be longer than a reasonable operator would be likely to try. Vent line 20 is protected without the necessity for adding any structure internal to tank 10, such as a float. Unlike the case with a float, liquid is not allowed to rise high enough to contact the opening to vent line 20 in the first instance. After fill is completed, the circuit 48 will be broken, and valve 26 reopened, either by the vehicle starting to open oil pressure switch 32, or by the time switch 46 automatically opening.

Variations of the preferred embodiment could be made. A normally open blocking valve other than a spring loaded slidable valve could be used, such as a gate valve that turned back and forth 180 degrees, but a spring loaded sliding valve like 26 cooperates particularly well with the solenoid 30. Other electromechanical devices that provided a mechanical motion in response to energization could be used to close the blocking valve 26, although a solenoid 30 would be the most likely choice. Any vehicle switch that responded to the condition of the vehicle not running, and was closed only then, would serve the same purpose as the oil pressure switch 32, although such switches are, again, practical and easily placed in an oil line. A conventional switch responsive to the ignition circuit being on would not be as advantageous, since that circuit could be on while the engine was not running. Any electrical switch that responded to the threshold tank pressure differential described above would work as the tank pressure switch. The combination of diaphragm 38 and contacts 44 is particularly simple and direct, however, and needs no alterations to tank 10 other than the hole through the top of tank 10 for pressure line 42. Therefore, it will be understood that it is not intended to limit the invention to just the preferred embodiment disclosed.

The embodiments of the invention in which an exclusive property or privilege is claimed are defined as follows:

1. In a vehicle that produces oil pressure only when running, and which has a fuel tank, a vapor storage canister, and a vent line running from a vapor pressure chamber at the top of said fuel tank to said canister, a tank overfill protection system, comprising, a normally open blocking valve in said vent line that can be moved to a closed position, an electromechanical device adapted to close said said blocking valve when energized, an electrical vehicle switch that is open only when said vehicle is running, a tank pressure activated electrical switch that moves from an open to a closed position when the pressure in said vapor pressure chamber rises above a predetermined threshold value, and, a timed electrical switch which is set to stay closed and pass current for only a predetermined time after it is first energized, and which then automatically opens to interrupt any circuit of which it is a part, and, a connecting circuit joining all of said switches in series, so that that current reaches said electromechanical device only when all three of said switches are closed, whereby, when said vehicle is not running and said tank is being filled, said vehicle switch will be closed, so that when said fuel level rises to the point that the pressure in said vapor pressure chamber rises above said threshold value, said tank pressure switch will close as well, thereby energizing said timed switch and said electromechanical device to close said blocking valve, thereby preventing any more fuel from entering said tank, and when said tank is not being filled, said electromechanical device will be deenergized to allow said blocking valve to reopen said vent line by virtue of said timed switch automatically opening or by said vehicle switch opening when said vehicle is restarted.

2. In a vehicle that produces oil pressure only when running, and which has a fuel tank, a vapor storage canister, and a vent line running from a vapor pressure chamber at the top of said fuel tank to said canister, a tank overfill protection system, comprising, a blocking valve in said vent line that can be moved between an open and a closed position, spring means biasing said valve to said open position, a solenoid which, when energized, overcomes said spring means to move said valve to said closed position, an oil pressure activated electrical switch that is open only when said vehicle is running, a tank pressure activated electrical switch that moves from an open to a closed position when the pressure in said vapor pressure chamber rises above a predetermined threshold value, and, a timed electrical switch which is set to stay closed and pass current for only a predetermined time after it is first energized, and which then automatically opens to interrupt any circuit of which it is a part, and, a connecting circuit joining said solenoid, oil pressure switch, tank pressure switch, and timed switch in series, so that that current reaches said solenoid only when all three of said switches are closed, whereby, when said vehicle is not running and said tank is being filled, said oil pressure switch will be closed, so that when said fuel level rises to the point that the pressure in said vapor pressure chamber rises above said threshold value, said tank pressure switch will close as well, thereby energizing said timed switch and said solenoid to close said blocking valve, thereby preventing any more fuel from entering said tank, and when said tank is not being filled, said solenoid will be deenergized to reopen said vent line by virtue of said timed switch automatically opening or by said oil pressure switch opening when said vehicle is restarted.

* * * * *